United States Patent [19]

Whistler

[11] Patent Number: 5,797,985
[45] Date of Patent: Aug. 25, 1998

[54] BANANA STARCH PRODUCTION

[76] Inventor: Roy L. Whistler, 320 Laurel Dr., West Lafayette, Ind. 47906

[21] Appl. No.: 824,303

[22] Filed: Mar. 26, 1997

[51] Int. Cl.$^6$ ............................................. C08B 30/04
[52] U.S. Cl. ............................................... 127/68
[58] Field of Search ...................................... 127/68

[56] References Cited

FOREIGN PATENT DOCUMENTS 49 (1974)-
149139    7/1976    Japan ........................ C13L 1/00

OTHER PUBLICATIONS

"Magnesium Bisulfite and Sodium Bisulfite as Alternative Steeping Agents for Wet Milling", Rausch, Singh, and Eckhoff, Cereal Chemistry, vol. 70(4),(1993) no month avail., pp. 489–490.

"Studies on Banana Pseudostem Starch: Production, Yield, Psysico–Chemical Properties and Uses", Subrahmanyan, Lal, Bhatia, Jain, Bains, Srinath, Anandaswamy, Krishna and Lakshminarayana; J. Sci. Food Agric., (May 8, 1957), pp. 253–261.

"Physicochemical Studies on Starches Isolated from Plantain Cultivars, Plaintain Hybrids and Cooking Bananas", Eggleston, Swennen and Akoni, Starch/Stärke, vol. 44 (4), (1992) no month avai., pp. 121–127.

"Characterization of the Starch and Fiber Fractions of Banana Fruit", Kayisu, A Thesis Presented to the Graduate School of Cornell University, (Jan. 1980), pp. 1–128.

"A Pilot Scale Study for Banana Starch Production", Chiang, Chu and Chu, Starch/Stärke, vol. 39(1),(1987) no month avail., pp. 5–8.

"Physicochemical Properties of Banana Fruit Starch and Starch Components", Patil and Magar, J. Indian Chem. Soc., vol. LI, (Dec., 1974) pp. 1004–1007.

"Physical Properties of Starch from Cavendish Banana Fruit", Ling, Osman, Fernandes and Reilly, Starch/Stärke, vol. 34(6), (1982) no month avail., pp. 184–188.

"Characterization of Starch and Fiber of Banana Fruit", Kayisu, Hood and Vansoest, Journal of Food Science, vol. 46(1981) no month avail. pp. 1885–1890.

"Investigation of the Physical and Chemical Properties of Banana Starches", Lii, Chang and Young, Journal of Food Science, vol. 47, (1982) no month avail. pp. 1493–1497.

*Primary Examiner*—David Brunsman
*Attorney, Agent, or Firm*—Barnes & Thornburg

[57] ABSTRACT

A process is described for isolating granular starch from bananas by making use of sodium bisulfite and naturally occurring enzymes in the bananas to promote release of starch granules from the banana fruit.

10 Claims, No Drawings

BANANA STARCH PRODUCTION

FIELD OF THE INVENTION

This invention relates to the production of banana starch using natural banana enzymes to break down the cell walls in a pulped banana slurry causing release of starch granules and allowing their recovery by filtration from the pulp residue and their separation from the aqueous dispersion by simple centrifugation.

BACKGROUND AND SUMMARY OF THE INVENTION

Banana starch is very likely to become a widely used starch commodity due to its desirable properties and to its potential production from low cost, cull bananas. It is known that about 25% of plantation grown bananas become culls. When banana bunches arrive at the central collection stations, bananas too small for shipping are removed along with those bananas that have damaged or spoiled areas that could cause microbial contamination of the bunch during shipping. This represents 25% of banana loss and a vast amount of financial loss.

If culls can be used for production of starch, they would represent a very large and significant source of starch that should be highly competitive in the world starch market. It would also improve crop economics and eliminate a large environmental problem.

To exalt the marketability of banana starch and lower its potential cost, I have developed a cost efficient process for producing starch from cull bananas. My process uses a minimum amount of processing chemicals, machinery and processing time. The new process comprises the step of steeping banana pulp with aqueous sodium bisulfite at pH of about 3.5 to about 5.5 for about 2 to about 8 hours, more preferably about 4 hours, at ambient to slightly elevated temperatures. During this steeping period the endogenous, banana enzymes such as pectinase, polygalacturonase, effectively work to disintegrate the plant cell walls allowing starch granules to be released into the aqueous steeping solution where they may be recovered by filtration through wire screens to remove cell walls and other non-starch pulp mass material and subsequent centrifugation.

DETAILED DESCRIPTION OF THE INVENTION

The present invention comprises pulping green bananas in water under conditions to obtain maximum cell wall breakdown without starch degradation. This is done by mechanically comminuting green bananas in the presence of about 0.5 to about 3.0% by weight, more preferably about 1% by weight sodium bisulfite solution at a pH of about 3.0 to about 5.5, more preferably at a pH of about 3.5 to about 5.2 and at about 20° to about 50° C., more preferably at ambient temperature providing optimum conditions for activation of the natural polygalacturonase and other enzymes that actively hydrolyze cell walls to open the plant cells and allow effective release of the starch granules. After about 2 to about 8 hours, most typically about 4 hours steeping time, the pulp is screened to remove fiber and the filtrate is then centrifuged to obtain granular banana starch in very good yield.

Green bananas or banana culls are separated from freshly harvested bunches and are quickly sliced and pulped in a blender, such as a Waring blender or its equivalent commercial type, with a 1% by weight sodium bisulfite water solution at pH 4 to 5.2 initially at ambient temperature. The temperature may rise, due to pulping energy input, to 40°–50° C. The resulting dispersion is allowed to stand or is slowly stirred for about 4 hours and filtered on a 75 micron sieve. The filtrate is centrifuged to settle the starch granule layer which may be surface scrapped to remove residual protein and then dried. Normally, any Steeping temperature below gelatinization of starch may be used.

EXAMPLE I

Green banana slices (100 grams; 5 mm thick) were placed in 200 g of 1% sodium bisulfite solution at pH 4.5 and blended in a Waring blender for 10 minutes and allowed to stand at 40° C. for 4 hours. The mixture was then filtered on a 200 mesh screen to remove pulp which was washed with a small amount of water. The filtrate was first centrifuged at 100×g to remove residual peel and fiber in the starch slurry. Thereafter the decanted starch slurry was centrifuged at 1000×g to precipitate the starch. The yield of dried banana starch from green bananas obtained from a wholesale banana warehouse was 20.1%.

I claim:

1. A process for isolating starch granules from green bananas to take advantage of naturally occurring enzymes in banana plant tissue, said process comprising the steps of pulping the bananas, steeping the pulped bananas in sodium bisulfite solution at pH of about 3.5 to about 5.5 for a period of time sufficient to release the starch granules from the banana pulp, separating the starch as a starch slurry from the non-starch pulp, and isolating the starch from the starch slurry.

2. The process of claim 1 wherein pulp is steeped with aqueous sodium bisulfite at a pH of about 3.5 to about 5.2.

3. The process of claim 1 wherein the banana pulp is steeped with about 1% by weight sodium bisulfite solution at pH of about 4.5 for about 3 to about 5 hours.

4. The process of claim 1 wherein the banana pulp is steeped with about 1% by weight sodium bisulfite at pH of about 4.5 for about 4 hours at about 40° C.

5. The process of claim 1 wherein the banana pulp is steeped with about 1% by weight sodium bisulfite at pH about 4.0 to about 5.0 at a temperature below the gelatinization temperature of banana starch.

6. A process for isolating starch granules from green bananas to take advantage of naturally occurring enzymes in banana plant tissue, said process consisting essentially of the steps of pulping the bananas, steeping the pulped bananas in sodium bisulfite solution at pH of about 3.5 to about 5.5 for a period of time sufficient to release the starch granules from the banana pulp, separating the starch as a starch slurry from the non-starch pulp, and isolating the starch from the starch slurry.

7. The process of claim 6 wherein pulp is steeped with aqueous sodium bisulfite at a pH of about 3.5 to about 5.2.

8. The process of claim 6 wherein the banana pulp is steeped with about 1% by weight sodium bisulfite solution at pH of about 4.5 for about 3 to about 5 hours.

9. The process of claim 6 wherein the banana pulp is steeped with about 1% by weight sodium bisulfite at pH of about 4.5 for about 4 hours at about 400° C.

10. The process of claim 6 wherein the banana pulp is steeped with about 1% by weight sodium bisulfite at pH about 4.0 to about 5.0 at a temperature below the gelatinization temperature of banana starch.

* * * * *

UNITED STATES PATENT AND TRADEMARK OFFICE
CERTIFICATE OF CORRECTION

PATENT NO. : 5,797,985
DATED : Aug. 25, 1998
INVENTOR(S) : Roy L. Whistler

It is certified that error appears in the above-indentified patent and that said Letters Patent is hereby corrected as shown below:

In the Specification

In Column 2, line 7, please replace "Steeping" with -- steeping --.

In the Claims

In Claim 9, Column 2, line 61, replace "400°C" with -- 40°C --.

Signed and Sealed this

Twenty-third Day of March, 1999

Attest:

Q. TODD DICKINSON

*Attesting Officer*  *Acting Commissioner of Patents and Trademarks*